United States Patent [19]
Barnebey

[11] 3,795,090
[45] Mar. 5, 1974

[54] FLUID FILTER CONSTRUCTION
[75] Inventor: Herbert L. Barnebey, Columbus, Ohio
[73] Assignee: Barnebey-Cheney Co., Columbus, Ohio
[22] Filed: Aug. 25, 1972
[21] Appl. No.: 283,783

[52] U.S. Cl. .................................. 55/387, 55/521
[51] Int. Cl. ............................................ B01d 53/04
[58] Field of Search ..... 55/77, 79, 98, 99, 387–390, 55/512, 521

[56] References Cited
UNITED STATES PATENTS
3,022,861  2/1962  Harms .................................. 55/521
3,747,308  7/1973  Versluis et al. ....................... 55/387

Primary Examiner—Charles N. Hart
Attorney, Agent, or Firm—Wm. Henry Venable

[57] ABSTRACT

This disclosure pertains to the construction of assemblies of granular material filled adsorbers or filters for fluids using modular components readily standardized to facilitate assembly of a variety of filter unit sizes and in diverse patterns from stock manufactured parts. The adsorbent filled panels are between airspace panels which are modular components of this invention. The other modular components include a hopper shaped housing and supporting and spacing means for assembling the air-space modules inside the housing. The filter is completed by filling the hopper, between the air-space modules, with granular adsorbent or other filtering medium.

2 Claims, 6 Drawing Figures

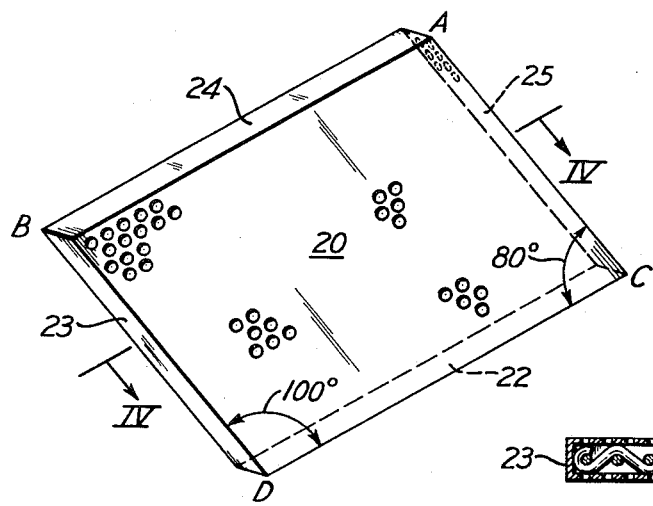
Fig. 3
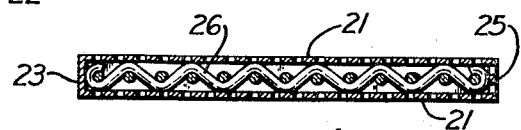
Fig. 4
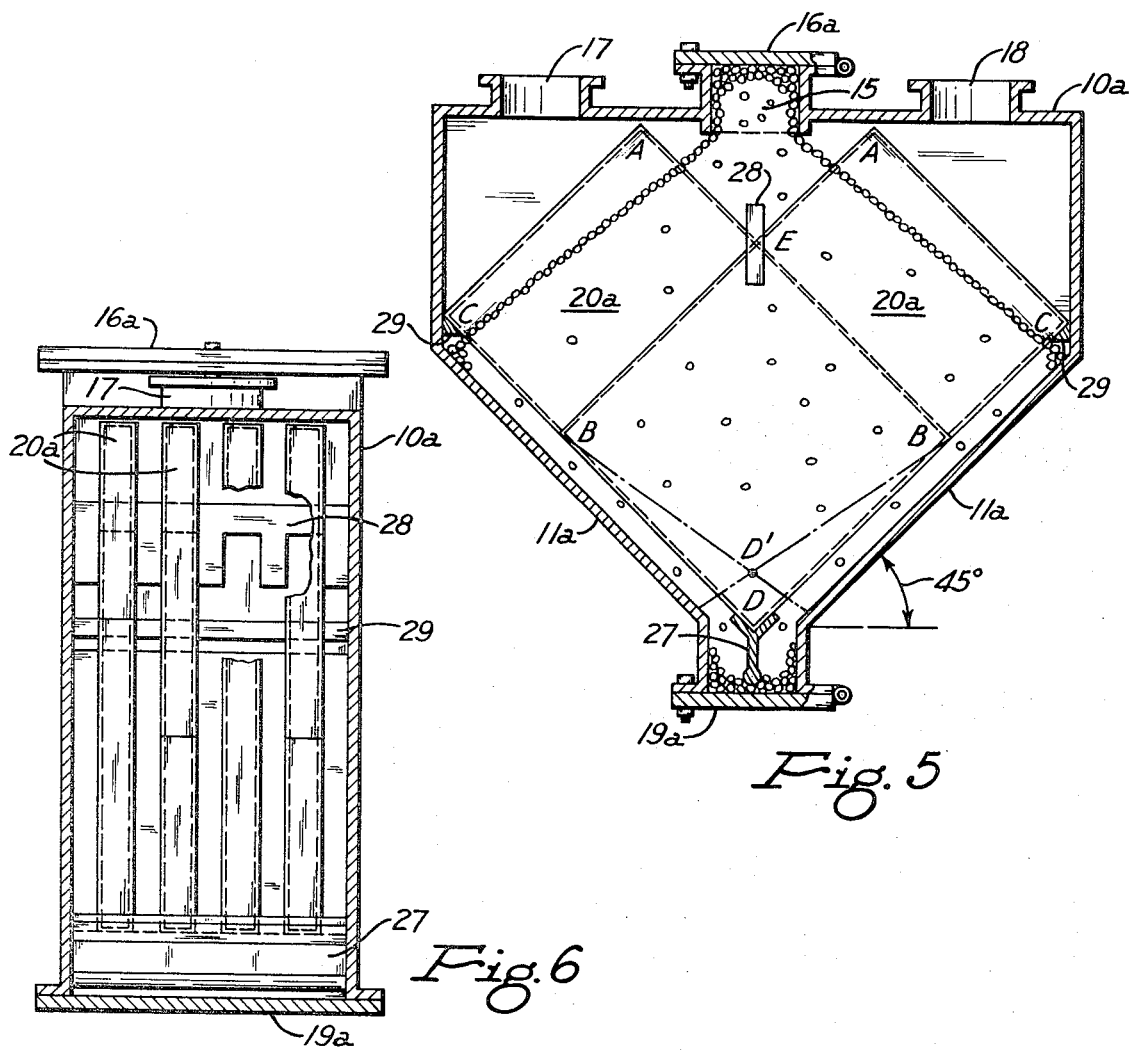
Fig. 5
Fig. 6

FLUID FILTER CONSTRUCTION

CROSS-REFERENCE TO A RELATED APPLICATION

The modular components disclosed herein are particularly adapted to be assembled in the form of a Fluid Filter with Submerged Passages as broadly disclosed and claimed in co-pending Barnebey et al. patent application Ser. No. 122,970 filed on Mar. 10, 1971.

BRIEF SUMMARY OF THE INVENTION

This invention relates to granular-filled filters or adsorbers in the form of a series of generally vertical-plane surfaced layers of granular adsorbent with fluid inlet and air outlet spaces between alternate layers, assembled in a housing such that the granular material may be poured into the layers to fill them and drained therefrom for renewal from time to time with fresh adsorbent or filtrate, as generally disclosed in the Barnebey et al. application cited above. In this invention the housing is a hopper having a filter material inlet opening at the center of the top of the hopper and a filter material discharge outlet at the center of the bottom of the hopper. From the bottom opening on each side the hopper wall is inclined at an angle at least as great as the angle of repose of the granular filtrate material deposited therein, and within the hopper are assembled a series of spaced apart, parallelogram shaped air-space panels. These panels extend between ends one of which is above the surface of the heap of material as filled from the filling opening and the other of which is closely adjacent one of the sloping hopper walls. The top edge of each panel is substantially submerged beneath the surface of the granular material.

BRIEF DESCRIPTION OF DRAWINGS

In the annexed drawings,

FIG. 3 is an isometric view of an alternate form of air-space forming module and FIG. 4 is a cross section therethrough at the plane IV—IV indicated in FIG. 3.

FIG. 5 is a vertical section similar to FIG. 1 illustrating an alternate construction and FIG. 6 is a side view thereof, with the side of the hopper facing the viewer removed to show the interior construction.

DETAILED DESCRIPTION

Figure 1:
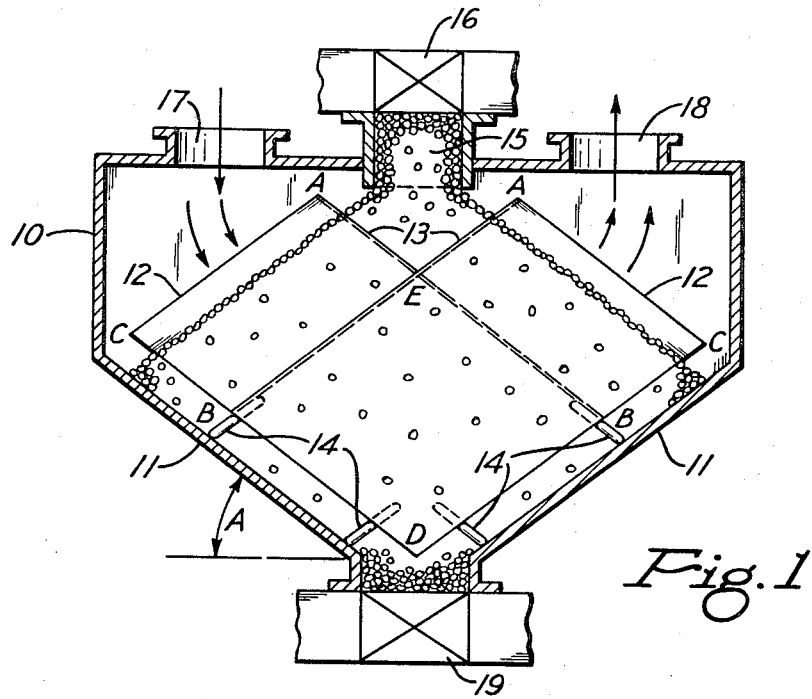
FIG. 1 is a vertical section taken through the hopper at a plane parallel to the filter and air-space panels.
Figure 2:
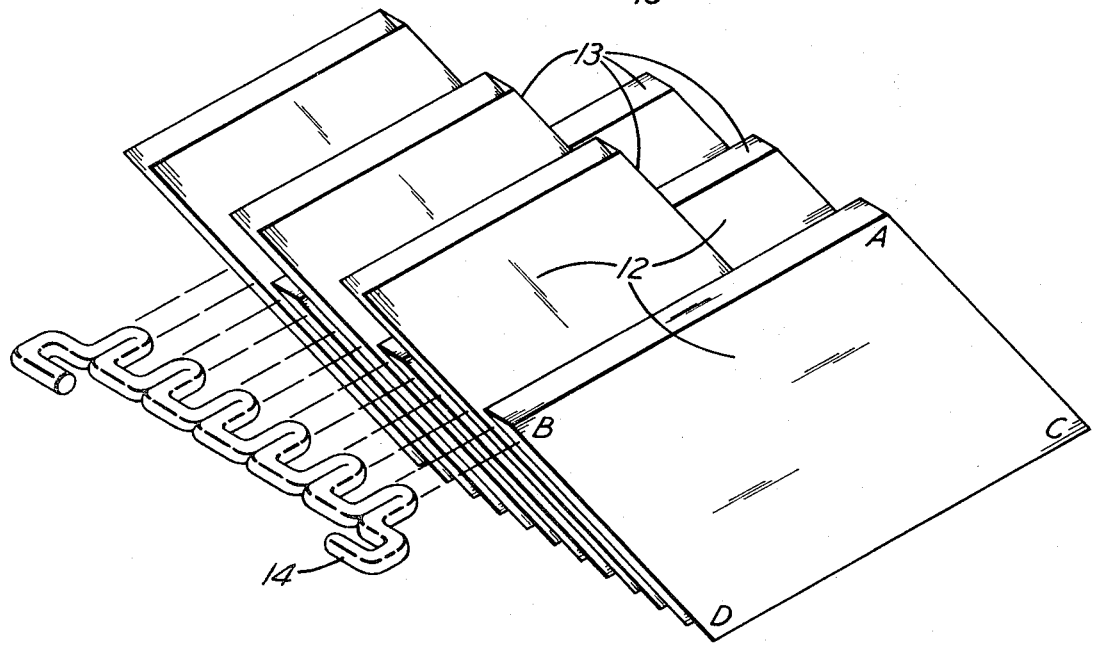
FIG. 2 is an isometric view of a set of air-space forming screen modules as it would be assembled within the hopper as shown in FIG. 1.

Referring to the drawings, FIGS. 1 and 2 illustrate a very simple embodiment of my invention. It is comprised of a hopper 10 having sloping walls 11 on opposite sides. The angle "A" of inclination of these walls is substantially the angle of repose of the granular filtering material with which the hopper is filled, typically around 35° to 40°. Within the hopper are installed a series of folded screens 12, the U-bend or fold 13 of each screen being the top of the long edges of the plane screen sides which are parallelograms, the edges of which are parallel to the sloping hopper walls when installed. These screens are supported in spaced apart relation by four spacer supports 14, shown in the drawings as formed by bending a rod, but any other suitable construction may be used. The hopper is filled with granular solids 15 through a centrally located filling opening 16, from which it forms a heap the top surface of which is at the angle of repose of the solids 15 and extends to the sloping walls 11 on each side. The mesh, or size of perforations through the screens, is selected to retain the particles of the selected size of granules 15; e.g., for 6 × 10 particle size, which is very common, the screen selected would have openings roughly 0.05 inches in size.

The long sides AB and CD of the parallelogram shaped folded screen modules are dimensioned, with respect to the size of the hopper modules, such that upper sides AC are above the surface of the heap of granular filter material 15, and the short sides AC and BD are dimensioned such that the folded U-bends 13, installed along the upper side AB, extend through the heap so as to be covered thereby except for a short distance adjacent the upper corners. The sides AB cross one another at the point E in FIG. 1, and when the hopper is filled with granular material with the top of the heap reaching the filling valve 16, the assembly contains a series of equal sided, parallelogram shaped panels between adjacent folded screens 12, the corners of which are indicated by the letters BEBD in FIG. 1.

Fluid inlet and outlet connection openings 17 and 18 are provided in the top of the hopper on each side of the filling opening 16. Thus air or other fluid to be filtered, entering the hopper at inlet 17, flows into the ends AC between the folds of screens 12 on one side laterally through the panels BEBD of filtering material 15 into the open space formed by the next adjacent folded screens 12, from which the fluid flows upwardly and out the ends AC below the outlet opening 18. Such flow is continued until the adsorbent in the panels BEBD has become "spent," when it is removed for regeneration through a bottom solids outlet valve 19.

The granular adsorbent 15 does not "fluidize" easily and is not likely to do so during the filling operation. Hence when the lowermost sides BD and CD are sloped at the angle of repose of the granular material 15, none flows upwardly between the two screens of a folded screen 12 and it is unnecessary to have any barrier to solids material flow along these sides, the barrier formed by the fold 13 at the top being all that is necessary. However, from the point of view of rigidity of module construction during storage and assembly, the alternate embodiment 20 of air-space module shown in FIGS. 3 and 4, hereafter referred to as the "mattress type," is convenient. With this construction, besides being the material for the sides 21, the perforate screen also covers the bottom edges 22 and 23, and the upper end 25 in addition to the top fold 24. Between the screen faces 21, spacing them rigidly at the desired distance apart, is provided a parallelogram of woven wire mesh 26 to which the surface of the screen faces may be laced at convenient spaced intervals. Any other means for supporting the screen faces 21, such as a ribbing of reinforcing bars, for example, may be substituted for the woven mesh 26. The use of screen material on the sides 22, 23 and 24 of such mattress type air-space modules is optional. A section of imperforate metal or plastic strip may be substituted, but it is preferable to use perforate material for both ends 23 and 25 so that either end may be at the top when installed.

The mattress type of module has another advantage when the sloping walls 11 of the hopper are inclined to the horizontal at an angle "A" greater than the angle of repose of the granular adsorbent material 15, e.g., at 45° which is convenient as a practical matter since this permits the air-space modules to be rectangular. This is illustrated in FIG. 5, in which the hopper 10a has sloping side walls 11a inclined at 45°, but is otherwise the same as the hopper 10 in FIG. 1. When rectangular shaped, folded screen air-space modules are used in such a hopper, the granular material is free to flow between the screens from the bottoms of the folds B at its angle of repose, to a bottom level D' somewhat above the bottom corners D of the screen panels. The use of mattress rectangularly shaped air-space modules 20a, having the sides BD closed off, provides a greater area of filtering panel (the square BEBD) than the four sided panel area BEBD', thus affording a greater efficiency in utilization of granular filtrate material 15.

FIGS. 5 and 6 show alternate means for supporting and spacing the air-space modules, to that shown in FIGS. 1 and 2, particularly adapted to support mattress type modules. Across the bottom of the hopper above the solids outlet door 19a, a Y-bar 27 extends into which is lodged the lowermost corners D of the panels 20a. At their intersection below the filling door 18a, a notched spacing bar 28 extends from side to side of the hopper, spacing alternate modules 20a inserted in the spaced notches. The corners C rest on ledges 29 secured to the hopper wall adjacent the top of the inclined sides 11a.

The foregoing disclosure illustrates and describes several embodiments of my Modular Filter, but my invention is not limited thereto but is more broadly set forth in the following claims.

I claim:

1. In a filter assembly comprising a hopper, a set of spaced apart hollow panels and a filling of granular filtering material, the construction characterized by a hopper having substantially vertical side walls on two opposite sides and inclined side walls on the adjacent opposite sides, a solids filling inlet at the top center of said hopper, a solids removal outlet at the bottom center of said hopper, said inclined side walls sloping upwardly from opposite sides of said solids removal outlet at an angle from the horizontal at least as great as the angle of repose of the granular filtering material, the distance between said solids filling inlet and said solids removal outlet being such that the top surface of the heap of granular material at its angle of repose extends to said inclined side walls on each side of said hopper when filled, thus leaving an empty space in said hopper on each side of said filling inlet, fluid passage openings in the wall of said hopper enclosing each said empty space, a plurality of air-space panel modules assembled spaced in parallel relation within said hopper, each such air-space panel having two parallel screen sides the edges of which are parallel to said inclined side walls of said hopper, the lower two of said edges being adjacent but spaced from said inclined side walls, said panels being parallelograms of which the long dimension is such that the upper end of the panel is above the surface of the heap in one of said empty spaces, and the short dimension of which is such that the upper side of said panel extends through said surface below the surface of the heap on the opposite side of said hopper, said upper side of said panels being a cover barring flow of filtering material from said filling opening from filling the space between said two parallel screen sides of said panels, said plurality of panels being assembled with their long dimensions alternately extending into the empty spaces on opposite sides of said hopper.

2. A filter as set forth in claim 1 in which said panel screens are rectangular, and the lower sides and ends thereof are covered barring flow of filtering material at its normal angle of repose up into said panels between said parallel screens.

* * * * *